(12) United States Patent
Legler

(10) Patent No.: US 11,520,763 B2
(45) Date of Patent: Dec. 6, 2022

(54) AUTOMATED OPTIMIZATION FOR IN-MEMORY DATA STRUCTURES OF COLUMN STORE DATABASES

(71) Applicant: SAP SE, Walldorf (DE)

(72) Inventor: Thomas Legler, Walldorf (DE)

(73) Assignee: SAP SE, Walldorf (DE)

( * ) Notice: Subject to any disclaimer, the term of this patent is extended or adjusted under 35 U.S.C. 154(b) by 194 days.

(21) Appl. No.: 16/830,645

(22) Filed: Mar. 26, 2020

(65) Prior Publication Data
US 2021/0303533 A1    Sep. 30, 2021

(51) Int. Cl.
| | | |
|---|---|---|
| *G06F 16/00* | (2019.01) | |
| *G06F 16/22* | (2019.01) | |
| *G06F 16/2457* | (2019.01) | |
| *G06F 16/2458* | (2019.01) | |
| *G06F 16/25* | (2019.01) | |

(52) U.S. Cl.
CPC ...... *G06F 16/2246* (2019.01); *G06F 16/2457* (2019.01); *G06F 16/2458* (2019.01); *G06F 16/252* (2019.01)

(58) Field of Classification Search
CPC ............. G06F 16/2246; G06F 16/2457; G06F 16/2458; G06F 16/252
See application file for complete search history.

(56) References Cited

U.S. PATENT DOCUMENTS

2011/0246503 A1* 10/2011 Bender ................. G06F 16/258
707/769

OTHER PUBLICATIONS

LeetCode, 814. Binary Tree Pruning, published on or before Apr. 10, 2018 (as evidenced by comments posted on the page), retrieved on Nov. 24, 2021, retrieved from the Internet <URL: https://leetcode.com/problems/binary-tree-pruning/> (Year: 2018).*

OpenDSA, "12.6 B-Trees", indexed on Oct. 31, 2019 (by web.archive.org), retrieved on Nov. 30, 2021, retrieved from the Internet <URL: https://opendsa-server.cs.vt.edu/ODSA/Books/CS3/html/BTree.html> (Year: 2019).*

* cited by examiner

*Primary Examiner* — Tyler J Torgrimson
(74) *Attorney, Agent, or Firm* — Mintz Levin Cohn Ferris Glovsky and Popeo, P.C.

(57) ABSTRACT

There is provided a method for compressing a first tree data structure. The method includes determining, by a processor, to compress a first tree data structure associated with a dictionary of a database management system. The method further includes compressing the first tree data structure to generate a compressed tree data structure. The compressing includes traversing, by the processor and in response to the determining, the first tree data structure on a lowest level. The compressing further includes identifying, by the processor and in response to traversing, empty nodes on the lowest level. The compressing further includes removing the identified empty nodes to compress the lowest level. The compressing further includes constructing, in response to the removing, a second level of the compressed tree data structure based on the compressed lowest level, the second level higher in the compressed tree data structure than the compressed lowest level.

18 Claims, 6 Drawing Sheets

AUTOMATED OPTIMIZATION FOR IN-MEMORY DATA STRUCTURES OF COLUMN STORE DATABASES

TECHNICAL FIELD

The subject matter described herein relates generally to database processing and, more specifically, to query execution and optimizing database performance in column store databases.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

Systems, methods, and articles of manufacture, including computer program products, are provided for data management. In one aspect, there is provided a system. The system may include at least one data processor and at least one memory. The at least one memory may store instructions that result in operations when executed by the at least one data processor. The operations may include determining to compress a first tree data structure associated with a dictionary of a database management system. The operations may further include compressing the first tree data structure to generate a compressed tree data structure. The compressing includes traversing, in response to the determining, the first tree data structure from on a lowest level. The compressing further includes identifying, in response to traversing, empty nodes on the lowest level. The compressing further includes removing the identified empty nodes to compress the lowest level. The compressing further includes constructing, in response to the removing, a second level of the tree data structure based on the compressed lowest level, the second level higher in the tree data structure than the lowest level.

In another aspect, there is provided a method. The method includes determining, by a processor, to compress a first tree data structure associated with a dictionary of a database management system. The method further includes compressing the first tree data structure to generate a compressed tree data structure. The compressing includes traversing, by the processor and in response to the determining, the first tree data structure on a lowest level. The compressing further includes identifying, by the processor and in response to traversing, empty nodes on the lowest level. The compressing further includes removing, by the processor, the identified empty nodes to compress the lowest level. The compressing further includes constructing, by the processor and in response to the removing, a second level of the compressed tree data structure based on the compressed lowest level, the second level higher in the compressed tree data structure than the compressed lowest level.

In another aspect, there is provided a non-transitory computer program product storing instructions which, when executed by at least one data processor, causes operations which include determining to compress a first tree data structure associated with a dictionary of a database management system. The operations may further include compressing the first tree data structure to generate a compressed tree data structure. The compressing includes traversing, in response to the determining, the first tree data structure on a lowest level. The compressing further includes identifying, in response to traversing, empty nodes on the lowest level. The compressing further includes removing the identified empty nodes to compress the lowest level. The compressing further includes constructing, in response to the removing, a second level of the tree data structure based on the compressed lowest level, the second level higher in the tree data structure than the lowest level.

In some variations, one or more features disclosed herein including the following features may optionally be included in any feasible combination. For example, the operations and/or method may further include receiving a write operation request. The operations and/or method may further include determining, in response to the write operation request, a location to write a value in the tree data structure. The operations and/or method may further include splitting, in response to the determining, a node of the tree data structure into two nodes. The operations and/or method may further include inserting, in response to the splitting, the value across the split two nodes. In some aspects, determining to compress the tree data structure may include obtaining information regarding the tree data structure, the information including a quantity of values included in the tree data structure, a quantity of nodes in the tree data structure, and/or a quantity of read operations and a quantity of write operations; comparing, in response to the obtaining, the quantity of values to the quantity of nodes and the quantity of write operations to a threshold; and determining, in response to the comparing, to compress the tree data structure. The traversing may include traversing the first tree data structure from left to right on the lowest level. Determining, in response to the comparing, to compress the tree data structure may include determining that a ratio of the quantity of values to the quantity of nodes satisfies a threshold; and determining that the quantity of write operations satisfies a threshold. Values of the second level may correspond to first values of blocks in the lowest level. Determining to compress the tree data structure may be based on a system load, an availability or lack of computation resources such as memory. Removing the identified empty nodes to compress the lowest level may include removing a subset of the identified empty nodes on a portion of the tree data structure. The operations and/or method may further include executing a background process, the background process collecting information regarding the tree data structure. Determining to compress the tree data structure may be based on the collected information.

Implementations of the current subject matter may include methods consistent with the descriptions provided herein as well as articles that include a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein. Computer implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Database tables are generally stored by column or by row. Column store databases may vertically partition a database into a collection of individual data columns that are stored separately in a column-oriented structure. In row store database management systems, data is partitioned into row blocks that are stored separately. Column-store database management systems typically implement dictionary compression for data storage. The phrase "column-store database" refers to a database management system configured to store data tables by column rather than by row. The column-oriented database may be better suited for responding to queries (when compared to a row-oriented database) as the column-oriented database is able to precisely access the data responsive to the query. The column-oriented database may store some if not all of the data in-memory, although a persistent store may be used as well.

A database system may include index structures, such as B-trees, for efficient searching, reading, and writing of database values. A B-tree is a self-balancing tree data structure that may maintain sorted data in a hierarchical manner and may allow searches, sequential access, insertions, and/or deletions in logarithmic time. A B-tree may store data such that each node contains keys in ascending order. Each of these keys may have two references to another two child nodes. The left-side child node keys may be less than the current keys and the right-side child node keys may be more than the current keys. If a single node has "n" number of keys, then it may have a maximum of "n+1" child nodes. A lowest level of a B-tree may include a level that has no child nodes. B-trees are typically not dense. For example, leafs or nodes of the B-tree may include empty memory blocks to allow for easy writing of data without a need for reorganizing the B-tree. While the empty blocks may be efficient for write functions, it may also result in an inefficient use of memory. It may be beneficial to compress these less dense B-trees to more efficiently utilize memory resources.

Figure 1A:
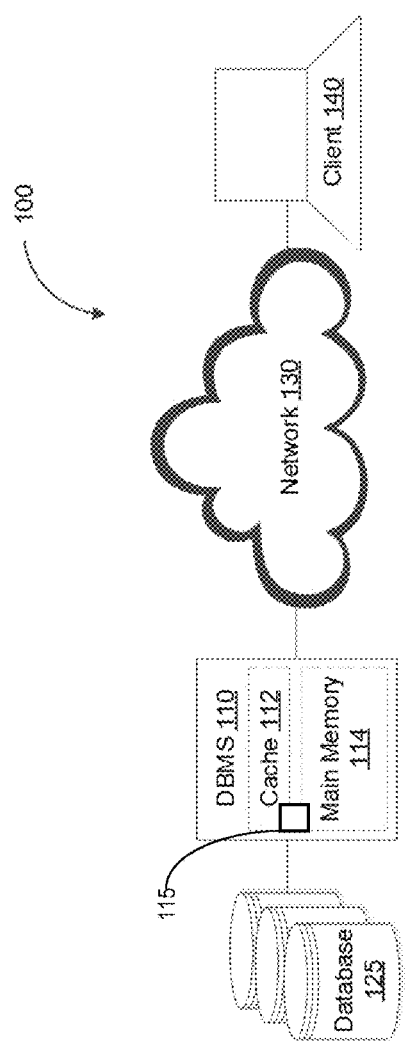
FIG. 1A depicts a system diagram illustrating an architecture of a database system, in accordance with some example embodiments.

FIG. 1A depicts a system diagram illustrating an architecture of a database system 100, in accordance with some example embodiments. Referring to FIG. 1A, the database system 100 may include a database management system (DBMS) 110 and a database 125. As shown in FIG. 1A, the database management system 110 may include a cache 112 and a main memory 114. The database management system 110 may support a variety of operations for accessing data held in the database 125. For instance, these operations may include structured query language (SQL) statements and/or the like. Meanwhile, the database 125 may be any type of persistence including, for example, data structures such as, for example trees, vectors, arrays, and/or the like, and/or databases such as, for example, including, for example, an in-memory database, a relational database, a non-SQL (NoSQL) database, and/or the like.

As shown in FIG. 1A, the database management system 110 may be communicatively coupled, via a network 130, with one or more clients including, for example, a client 140. The client 140 may be any type of processor-based device including, for example, a wearable device, a smartphone, a tablet personal computer (PC), a desktop computer, a laptop computer, and/or the like. Meanwhile, the network 130 may be a wired and/or wireless network including, for example, a wide area network (WAN), a local area network (LAN), a public land mobile network (PLMN), the Internet, and/or the like.

The client 140 may interact with the database management system 110 in order to access data records stored at the database 125. For example, the client 140 may send, to the database management system 110, one or more requests to access the data records stored at the database 125. The database management system 110 may respond to these requests from the client 140 by performing one or more corresponding database operations such as read, write, delete, or the like. In some example embodiments, the database management system 110 may perform a database operation that requires data from the cache 112 and/or the main memory 114. For example, the database management system 110 may perform the database operation by accessing the cache 112 in order to locate the data required to perform the database operation.

In order to perform database operations, the database management system 110 may need to read a dictionary of the database 125 in a sorted order. In order to provide a sort order of the dictionary, the database management system 110 may utilize a B-tree data structure 115. The B-tree data structure 115 may include a cache-sensitive B-tree (e.g., CSB-tree).

Figure 1B:
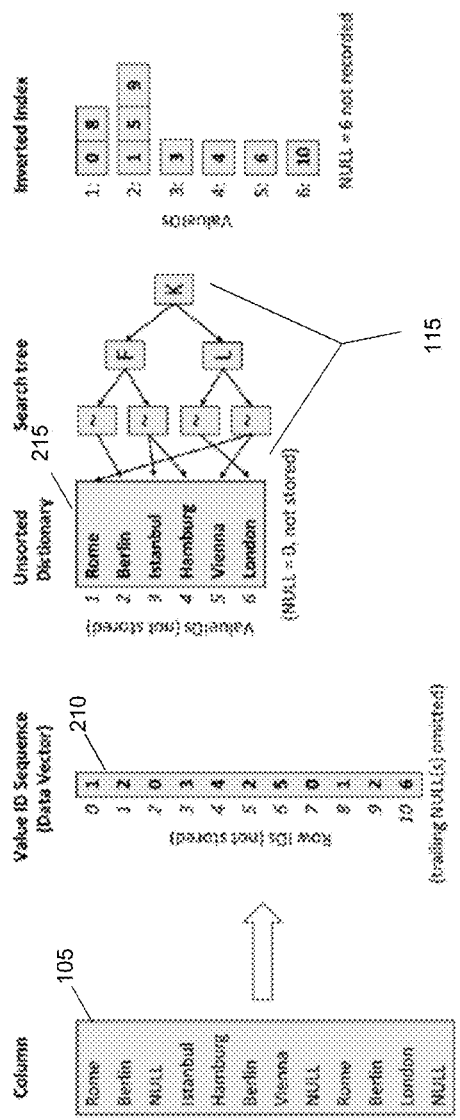
FIG. 1B illustrates an example of a delta fragment of a column-oriented database, according to some implementations of the current subject matter.

In a column-oriented database (also referred to as a column-store database), the values in the column may be compressed using a dictionary. As the values in a column may be of a similar type (e.g., a column of cites, a column of countries, a column of amounts), the dictionary may provide meaningful compression, when compared to row-oriented database where the values in a row can be dissimilar. FIG. 1B depicts an example of the columnar, value-ID-based storage layout employed in some column-oriented databases. The data vector 210 represents the values 105 encoded using the dictionary 215 and then stored in the column-oriented database. For example, the value "Rome" 102A is encoded using the dictionary value ID "4" 102B. The other values, such as Berlin, Istanbul, Hamburg, etc. are also encoded using the dictionary 115. The column 105 can thus be stored as the data vector 210.

A database, such as a column-oriented database, may include a read-optimized main fragment, which may be hold the majority of the data, and a small write-optimized delta fragment. FIG. 1B depicts a column 105 but encoded in a delta fragment of a column store database (e.g., database 125). FIG. 1B further includes a dictionary 215 for the delta fragment. The dictionary 215 is unsorted as the entries are as noted write optimized (e.g., append-only to enable fast insertion of new values) and the (2) NULL value IDs in the delta fragment has a predetermined value (e.g., 0) rather than a value based on the dictionary size as in the main fragment.

The loss of the dictionary 215 being sorted may severely impact query performance. For example, the "value" to "value-id" translation (which occurs in SQL WHERE filter evaluation, for example) may no longer be implemented using a binary dictionary search but instead the dictionary 215 is scanned row-by-row to find matching value IDs. To address this impact, the delta fragment's dictionary 215 may include an auxiliary search tree 115 structure (or, for example, a similar helper structure) to provide a sort order over the dictionary 215 or at least provide a one-to-one mapping between a value and a value ID. This structure, such as search tree 115, may provide sorted access to dictionary values in logarithmic time. For the sake of simplicity of explanation, FIG. 1B shows the auxiliary search tree 115 implemented as a binary search tree (e.g., B-tree) 115, although other types (including more complex) of optimized search tree structures (e.g., cache-sensitive B+-trees and the like) may be used as well. An example of a cache sensitive B-tree (CSB-tree) is described herein.

In the example of FIG. 1B, auxiliary search tree 115 (which in this example is a binary search tree) first divides the dictionary 215 values into values that begin with a character smaller than "K" and values beginning with a character bigger than "K." The next layer of the tree 215 divides the two partitions further into values that begin with a character smaller or larger than "F", respectively smaller/larger than "L". The leaf nodes in the last layer of the tree 115 finally only contain pointers to the dictionary entries that fulfil the partition criteria of the corresponding branch leading to the leaf node.

Figure 2:
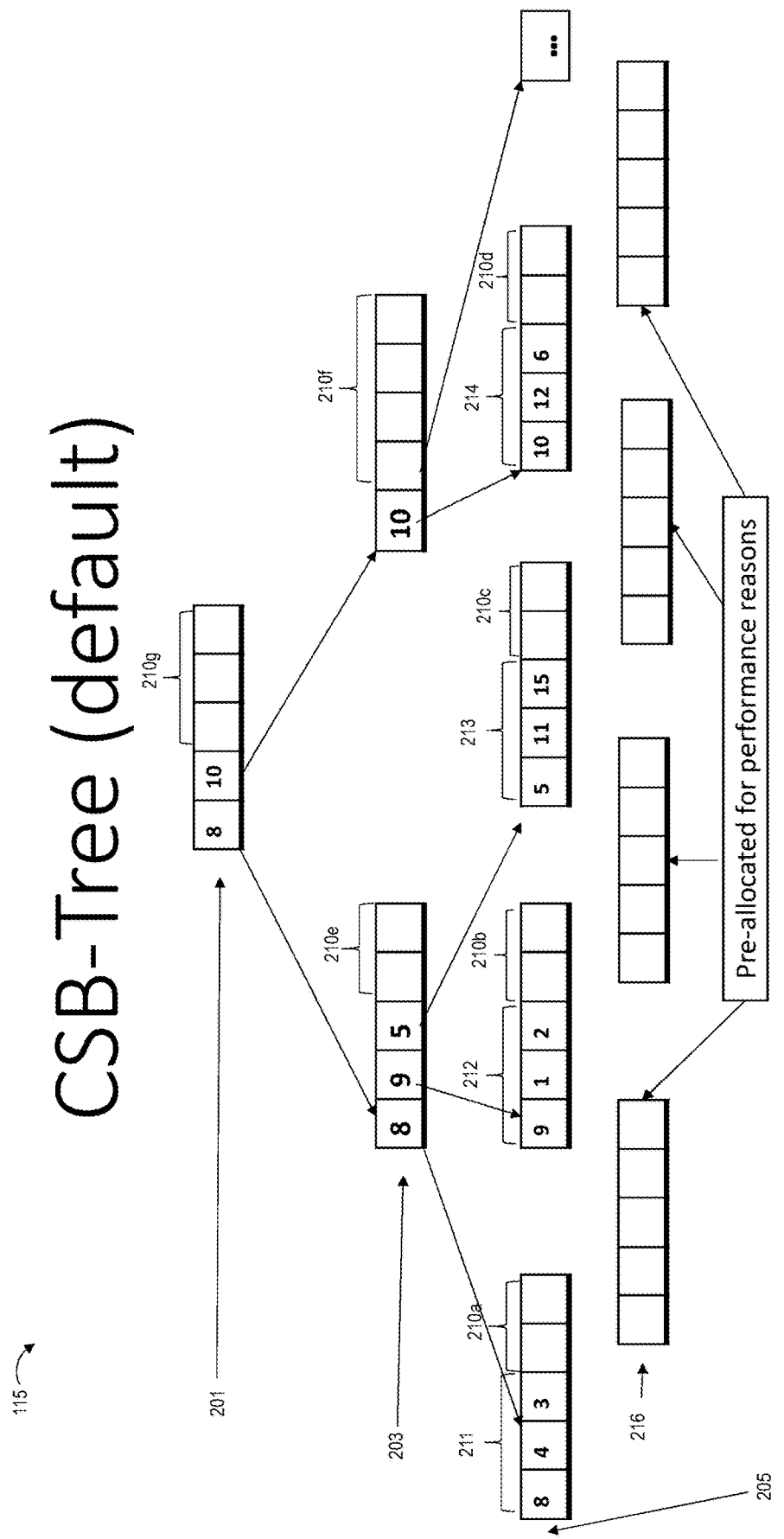
FIG. 2 depicts an example of a cache sensitive B-tree, in accordance with some example implementations.

FIG. 2 is a block diagram of an example cache sensitive B-tree (CSB-tree) 115. A CSB-tree is a variant of B-trees that may store all the child nodes of any given node contiguously, and may keep only the address of the first child in each node. The rest of the children may be found by adding an offset to that address. Since only one child pointer may be stored explicitly, the utilization of a cache line may be high. B-trees, such as CSB-tree 115, are typically optimized for inserts and may not be organized in a compact manner. For example, a CSB-tree may include approximately half empty nodes in the tree to facilitate storage or insertion of new values. These empty nodes may increase inefficiency due to memory space not being used. In some aspects, it may be beneficial to compress B-trees to reduce or remove empty nodes to increase efficiency and/or memory consumption.

As shown in FIG. 2, the CSB-tree 115 may include three levels or rows 201, 203, and 205, level 205 being the lowest level and level 201 being the highest. As further shown, the CSB-tree 115 also includes empty nodes 210 and pre-allocated empty nodes 216. In some aspects, the database management system 110 may determine it may be beneficial to compress the CSB-tree 115.

Determining whether to compress the CSB-tree 115 may include the database management system 110 obtaining information about characteristics of the CSB-tree 115. For example, the database management system 110 may obtain a quantity of values in CSB-tree 115, a quantity of allocated nodes in the CSB-tree 115, a quantity of readers and writers to the CSB-tree 115, or the like. The database management system 110 may compare the quantity of values to the quantity of allocated nodes and if that ratio satisfies a threshold, the database management system 110 may determine to compress the CSB-tree 115. Additionally, the database management system 110 may compare the quantity of write operations on the CSB-tree 115 to a threshold and if the quantity of write operations satisfy the threshold, the database management system 110 may determine to compress the CSB-tree 115. In some aspects, the database management system 110 may run a background process to obtain the information regarding the CSB-tree 115 based on certain conditions. For example, the database management system 110 may run the background process based on a time interval, a system load, a lack of resources, a predicted impact of the compression.

In some implementations, a B-tree, such as the CSB-tree 115, may include a large quantity of empty nodes 210. For example, 7 out of 8 bytes of a node may be held empty for possible insertions later. In such implementations, it may be possible to improve memory consumption by a factor of eight and on average by 75% by implementing the compression techniques described herein. Moreover, rather than performing a typical top-down traversal of a B-tree, the B-tree compression described herein utilizes a left to right, bottom-up traversal of the CSB-tree 115. For example, the compression process may traverse the lowest level 205 of the CSB-tree 115 to remove any empty nodes or gaps. After the lowest level 205 is compressed/created, higher levels of the B-tree (e.g., levels 203 and/or 201) are created based on the values of the lower level.

Figure 3:
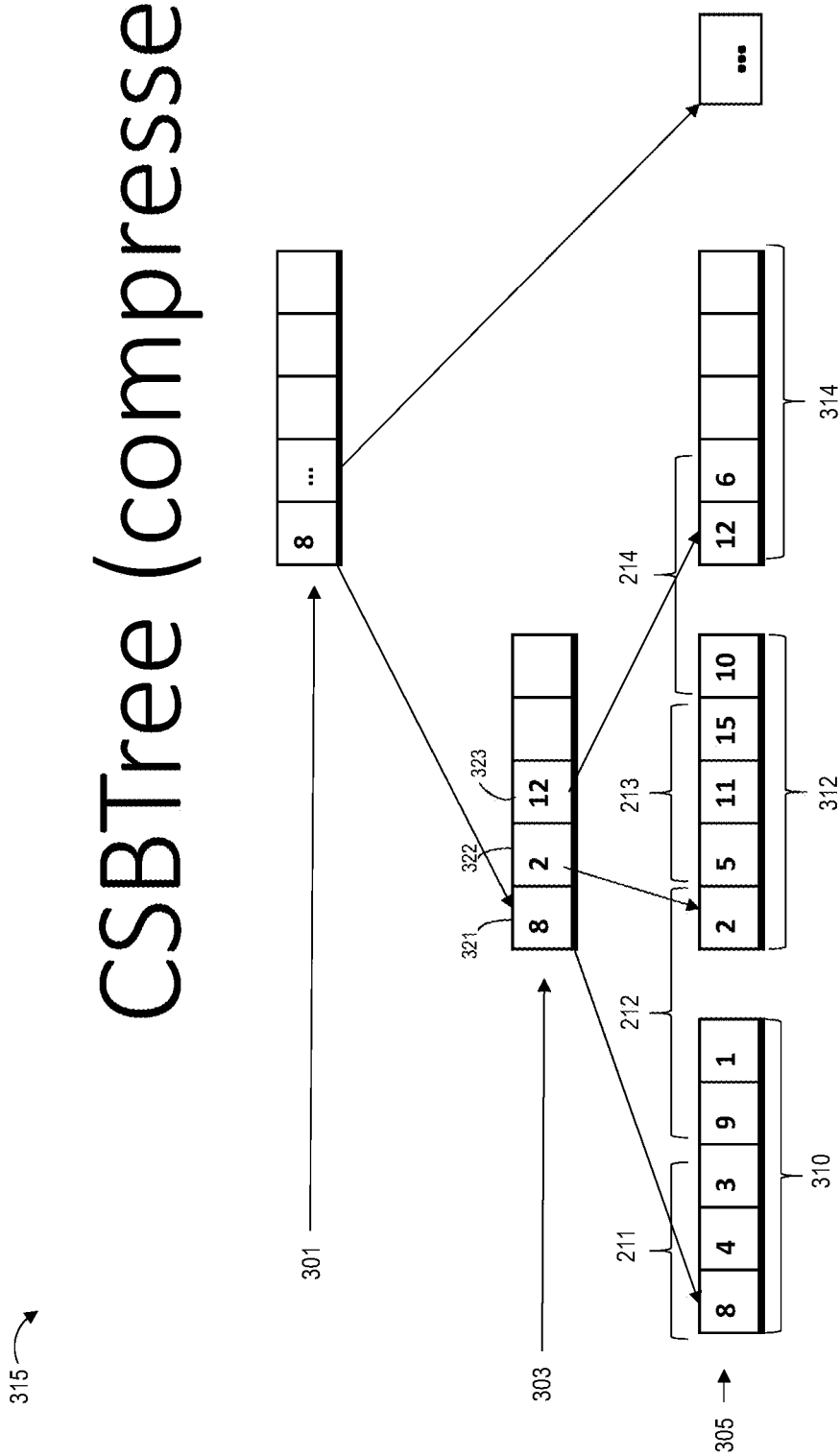
FIG. 3 depicts an example of a compressed B-tree, in accordance with some example implementations.

FIG. 3 depicts a diagram 300 of an example compressed B-tree 315, in accordance with some example implementations. As shown in FIG. 3, the database management system 110, may determine to compress the CSB-tree 115 and begin the compression by traversing the lowest level 205 of the CSB-tree 115. As shown in the example of FIG. 3, the lowest level 305 of the CSB-tree 315 has removed the empty nodes 210a, 210b, 210c, and 210d from the lowest level 205 of the CSB-tree 115. Accordingly, the lowest level 305 includes the values 211, 212, 213, and 214 without any empty nodes. After compression of the lowest level 305, the database management system 110 may construct the next highest level (e.g., level 303). Construction of the level 303 may be based on the lowest level 305. For example, the level 303 includes values indicating a starting value of child node blocks 310, 312, and 314.

As shown in FIG. 3, the first value (e.g., left-most value) 321 of level 303 is the number 8 which is derived from the first value of block 310 (e.g., first child node). The second value 322 of level 303 is the number 2, which is derived from the first value of block 312. The third value 323 of level 303 is the number 12, which is derived from the first value of block 314. The values of level 303 may further be constructed based on additional blocks of the level 305. Accordingly, since the level 303 is constructed based on the compress values of the level 305, the level 303 may also be compressed to remove empty nodes such as empty nodes 210e and 210f from the CSB-tree 115. Similar to the level 303, the values of level 301 may be determined based on the values of the level 303 and/or any lower levels (e.g., the level 305). While three levels and certain values are shown in the B-trees of FIGS. 2 and 3, more and/or fewer levels and different values in a B-tree are also consistent with the examples described herein.

Construction of the B-tree 315 from the CSB-tree 115 may involve an investment of CPU, time, and/or memory resources. The database management system 110 may determine when the investments of processing resources is beneficial. For example, the database management system 110 may obtain and analyze key metrics and information to determine whether to compress a B-tree data structure such as CSB-tree 115. For example, the database management system 110 may count a quantity of values stored in the B-tree (e.g., determine a size of a dictionary) and may count a total quantity of nodes in the B-tree. A ratio of the quantity of values versus the total quantity of nodes may indicate that the B-tree is not dense (e.g., has a large number of empty nodes) and may benefit from compression. The database management system 110 may also determine a quantity of read and write operations performed on the B-tree. A large number of read operations may indicate that compression may be beneficial and conversely, a large number of write operations may indicate that compression of the B-tree may not be beneficial. The database management system 110 may also analyze portions of the B-tree to determine whether compression may be beneficial on at least a portion of the B-tree. In some aspects, the partial compression of the B-tree may allow the database management system 110 to compress portions of the B-tree that have a large quantity of empty nodes quickly while maintaining other portions of the B-tree optimized for write operations.

After the database management system 110 compresses a B-tree (e.g., CSB-tree 115) to construct the B-tree 315. As shown in FIG. 3, the read operations may read the values 211-214 faster and without having to traverse empty nodes of the B-tree. Accordingly, reading values from a compressed B-tree (e.g., B-tree 315) may occur faster and/or involve less processing resources when using the using the bottom-up compression and construction of the B-tree 315 in FIG. 3 as opposed to using the uncompressed CSB-tree 115 as shown in FIG. 2.

Figure 4:
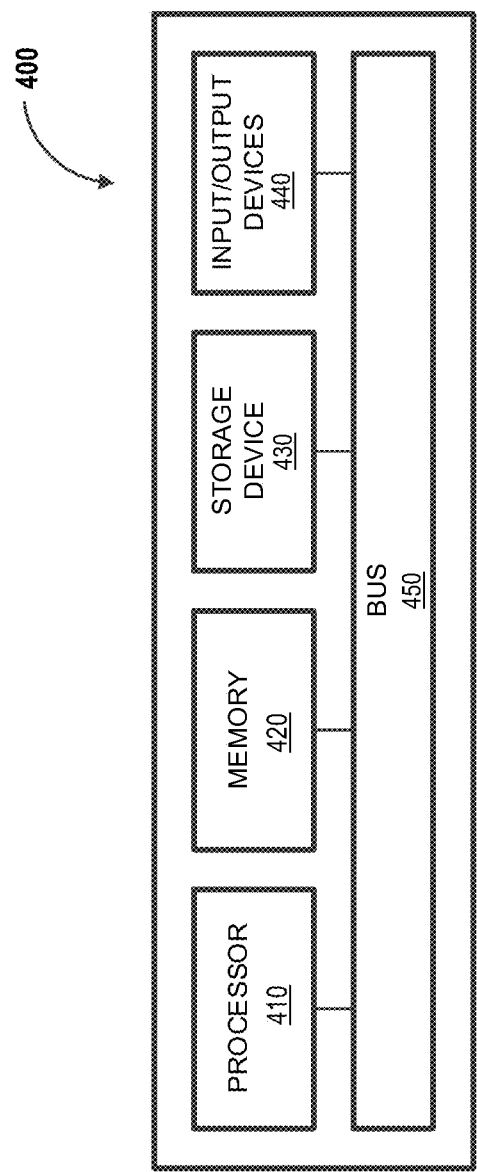
FIG. 4 depicts a block diagram illustrating a computing apparatus, in accordance with some example implementations.

FIG. 4 depicts a block diagram illustrating a computing apparatus 400 consistent with implementations of the current subject matter. Referring to FIG. 1, the computing apparatus 400 may be used to implement at least a portion of the database management system 110 and/or any components therein.

As shown in FIG. 4, the computing apparatus 400 may include a processor 410, a memory 420, a storage device 430, and input/output devices 440. The processor 410, the memory 420, the storage device 430, and the input/output devices 440 may be interconnected via a system bus 450. The processor 410 is capable of processing instructions for execution within the computing apparatus 400. Such executed instructions may be implemented by one or more components of, for example, the DBMS 110. In some example implementations, the processor 410 may be a single-threaded processor. Alternately, the processor 410 may be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing apparatus 400. The memory 420 may store data structures representing configuration object databases, for example. In some aspects, the memory 420 may include the cache memory 112 and/or the main memory 114. The storage device 430 is capable of providing persistent storage for the computing apparatus 400. The storage device 430 may be a floppy disk device, a hard disk device, an optical disk device, or a tape device, or other suitable persistent storage means. The input/output device 440 provides input/output operations for the computing apparatus 400. In some example implementations, the input/output device 440 includes a keyboard and/or pointing device. In various implementations, the input/output device 440 includes a display unit for displaying graphical user interfaces.

According to some example implementations, the input/output device 440 may provide input/output operations for a network device. For example, the input/output device 440 may include Ethernet ports or other networking ports to communicate with one or more wired and/or wireless networks (e.g., a local area network (LAN), a wide area network (WAN), the Internet). The input/output device 440 may include one or more antennas for communication over the network 120 with the client device 130 and/or a cloud infrastructure platform.

In some example implementations, the computing apparatus 400 may be used to execute various interactive computer software applications that may be used for organization, analysis and/or storage of data in various formats. Alternatively, the computing apparatus 400 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing products and/or functionalities. Upon activation within the applications, the functionalities may be used to generate the user interface provided via the input/output device 440. The user interface may be generated and presented to a user by the computing apparatus 400 (e.g., on a computer screen monitor, etc.).

Figure 5:
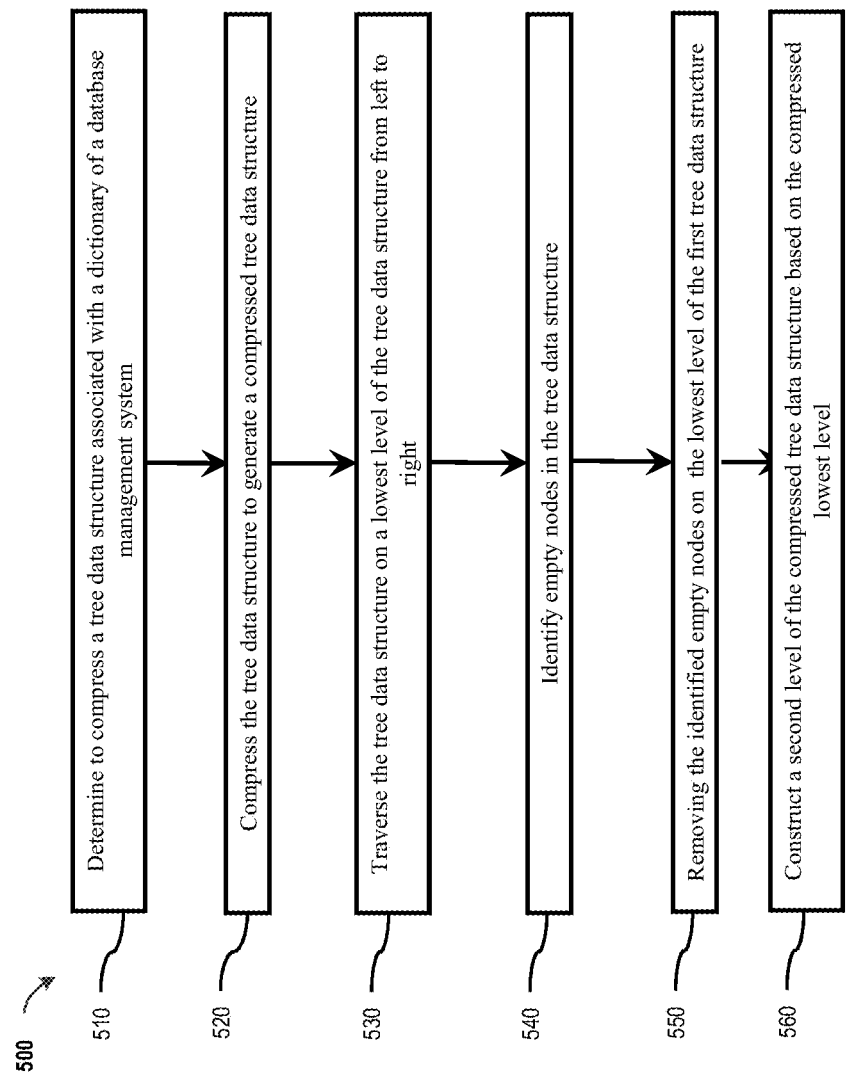
FIG. 5 depicts a flowchart illustrating a process for compressing a tree data structure, in accordance with some example implementations.

FIG. 5 depicts a flowchart illustrating a process 500 for compressing a tree data structure, in accordance with some example embodiments. Referring to FIGS. 1-4, the process 500 may be performed by a computing apparatus such as, the database management system 110 and/or the computing apparatus 400.

As noted above, the database management system 110 may utilize a search tree (e.g., B-tree 115) to provide a sort of order for the delta fragment's unsorted dictionary 215.

The database management system 110 may compress the search tree 115 to enable faster lookup/searches at the dictionary 215 (e.g., during a read operation). Such compression may also improve memory consumption and memory efficiency.

At operational block 510, the computing apparatus 400, for example, may determine to compress a first tree data structure (e.g., CSB-tree 115) associated with a dictionary of a database management system (e.g., dictionary 215 of the database management system 110). For example, the computing apparatus 400 may determine to compress the CSB-tree 115 of FIGS. 1A, 1B, and 2 based on information about the CSB-tree 115. The information about the CSB-tree 115 may include a quantity of values in the B-tree, a quantity of nodes in the B-tree, a quantity of write operations performed on the B-tree, or the like. The database management system 110 obtain the information about the CSB-tree 115 based on a periodic time interval, a system load, a lack of resources, a predicted impact of the compression, or the like. In some aspects, the database management system 110 may determine to compress the first tree data structure based on the periodic time interval, the system load, the lack of resources, the predicted impact of the compression, or the like.

At operational block 520, the computing apparatus 400, for example, may compress the tree data structure to generate a compressed tree data structure (e.g., B-tree 315). Compression of the tree data structure may include the process of operational blocks 530, 540, 550, and/or 560.

At operational block 530, the apparatus 400, for example, may traverse the first tree data structure on a lowest level of the tree data structure from left to right. For example, the apparatus 400 may traverse the lowest level 205 of the CSB-tree 115 starting at the left-most node (e.g., value 8 of values 211) and ending at a right-most node of the lowest level 205.

At operational block 540, the computing apparatus 400, for example, may identify empty nodes (e.g, nodes not storing data) in the tree data structure. For example, the computing apparatus 400 may identify empty nodes 210a, 210b, 210c, and 210d of the lowest level 205.

At operational block 550, the computing apparatus 400, for example, may remove, in response to identifying, the identified empty nodes on the lowest level of the tree data structure. For example, the DMBS 110, in response to traversing the lowest level 205 of the CSB-tree 115 and identifying empty nodes 210a, 210b, 210c, 210d, may remove the empty nodes 210a, 210b, 210c, and 210d from the lowest level 205 to construct the lowest level 305 of the B-tree 315. In some aspects, the computing apparatus 400, for example, may traverse the uncompressed tree (e.g., CSB-tree 115) from left to right, skipping the holes (e.g., empty nodes 210a, 210b, 210c, and 210d), and copy the relevant data (e.g., values 211, 212, 213, and 214) to a (now dense/compressed) new list of nodes (e.g., nodes of compressed level 305).

At operational block 560, the computing apparatus 400, for example, may construct, based on values of the compressed lowest level (e.g., level 305) a second level (e.g., level 303) of the tree data structure, the second level higher in the tree data structure than the lowest level. For example, values of nodes 321, 322, and 323 of the level 303 may be determined based on a first (e.g., left-most) child node of each of the nodes 321, 322, and 323, respectively. In this way, higher levels of the B-tree 315 may be constructed in a compressed manner, read times may be reduced, and processing/reading speeds may be improved for the compressed B-tree (e.g., B-tree 315).

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example, as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
      determining, by a database management system, to compress a first tree data structure associated with a dictionary of the database management system, wherein the first tree data structure comprises a cache sensitive B-tree used during read operations to search the dictionary, which is unsorted;
      compressing, by the database management system, the first tree data structure to generate a compressed tree data structure, wherein the compressed tree data structure comprises a compressed cache sensitive B-tree, the compressing comprising:
         traversing, in response to the determining, the first tree data structure on a lowest level;
         identifying, in response to traversing, empty nodes on the lowest level;
         removing the identified empty nodes to compress the lowest level; and
         constructing, in response to the removing, a second level of the compressed tree data structure based on the compressed lowest level, the second level higher in the compressed tree data structure than the compressed lowest level;
      receiving a read operation request;
      searching, in response to receiving the read operation request and using the compressed tree data structure, a database associated with the database management system; and
      returning a value associated with the read operation request, wherein searching the database using the compressed tree data structure is faster than searching the database based on the first tree data structure.

2. The system of claim 1, the operations further comprising:
   receiving a write operation request;
   determining, in response to the write operation request, a location to write a value in the compressed tree data structure;
   splitting, in response to the determining, a node of the compressed tree data structure into two nodes; and
   inserting, in response to the splitting, the value across the split two nodes.

3. The system of claim 1, wherein determining to compress the first tree data structure comprises:
   obtaining information regarding the first tree data structure, the information including a quantity of values included in the first tree data structure, a quantity of nodes in the first tree data structure, and a quantity of read operations and a quantity of write operations,
   comparing, in response to the obtaining, the quantity of values to the quantity of nodes and the quantity of write operations to a threshold, and
   determining, in response to the comparing, to compress the first tree data structure.

4. The system of claim 3, wherein the determining, in response to the comparing, to compress the first tree data structure comprises:
   determining that a ratio of the quantity of values to the quantity of nodes satisfies a threshold, and
   determining that the quantity of write operations satisfies a threshold.

5. The system of claim 1, wherein the traversing comprises traversing the first tree data structure from left to right on the lowest level.

6. The system of claim 1, wherein determining to compress the first tree data structure is based on a system load.

7. The system of claim 1, wherein removing the identified empty nodes to compress the lowest level comprises:
   removing a subset of the identified empty nodes on a portion of the first tree data structure.

8. The system of claim 1, the operations further comprising:
   executing a background process, the background process collecting information regarding the first tree data structure.

9. A method comprising:
   determining, by a processor, to compress first tree data structure associated with a dictionary of a database management system, wherein the database management system comprises the processor and at least one memory, wherein the first tree data structure comprises a cache sensitive B-tree used during read operations to search the dictionary, which is unsorted;
   compressing, by the processor, the first tree data structure to generate a compressed tree data structure, wherein the compressed tree data structure comprises a compressed cache sensitive B-tree, the compressing comprising:
      traversing, by the processor and in response to the determining, the first tree data structure on a lowest level;

identifying, by the processor and in response to traversing, empty nodes on the lowest level;

removing, by the processor, the identified empty nodes to compress the lowest level; and constructing, in response to the removing, a second level of the compressed tree data structure based on the compressed lowest level, the second level higher in the compressed tree data structure than the compressed lowest level;

receiving a read operation request;

searching, in response to receiving the read operation request and using the compressed tree data structure, a database associated with the database management system; and returning a value associated with the read operation request, wherein searching the database using the compressed tree data structure is faster than searching the database based on the first tree data structure.

10. The method of claim 9, further comprising:

receiving a write operation request;

determining, in response to the write operation request, a location to write a value in the compressed tree data structure;

splitting, in response to the determining the location, a node of the compressed tree data structure into two nodes; and inserting, in response to the splitting, the value across the split two nodes.

11. The method of claim 10, further comprising:

executing a background process, the background process collecting information regarding the first tree data structure.

12. The method of claim 11, wherein executing the background process is based on a time interval, a system load, an availability of computing resources, and/or a predicted impact of the compressing of the first tree data structure.

13. The method of claim 9, wherein determining to compress the first tree data structure comprises:

obtaining information regarding the first tree data structure, the information including a quantity of values included in the first tree data structure, a quantity of nodes in the first tree data structure, and a quantity of read operations and a quantity of write operations, comparing, in response to the obtaining, the quantity of values to the quantity of nodes and the quantity of write operations to a threshold, and determining, in response to the comparing, to compress the first tree data structure.

14. The method of claim 13, wherein the determining, in response to the comparing, to compress the first tree data structure comprises:

determining that a ratio of the quantity of values to the quantity of nodes satisfies a threshold, and determining that the quantity of write operations satisfies a threshold.

15. The method of claim 9, wherein values of the second level correspond to first values of blocks in the lowest level.

16. The method of claim 9, wherein the traversing comprises traversing the first tree data structure from left to right on the lowest level, and wherein determining to compress the first tree data structure is based on a system load.

17. The method of claim 9, wherein removing the identified empty nodes to compress the lowest level comprises removing a subset of the identified empty nodes on a portion of the first tree data structure.

18. A non-transitory computer readable medium storing instructions which, when executed by at least one processor, cause operations comprising:

determining, by a database management system, to compress a first tree data structure associated with a dictionary of the database management system, wherein the first tree data structure comprises a cache sensitive B-tree used during read operations to search the dictionary, which is unsorted;

compressing, by the database management system, the first tree data structure to generate a compressed tree data structure, wherein the compressed tree data structure comprises a compressed cache sensitive B-tree, the compressing comprising:

traversing, in response to the determining, the first tree data structure on a lowest level;

identifying, in response to traversing, empty nodes on the lowest level;

removing the identified empty nodes to compress the lowest level; and constructing, in response to the removing, a second level of the compressed tree data structure based on the compressed lowest level, the second level higher in the compressed tree data structure than the compressed lowest level;

receiving a read operation request;

searching, in response to receiving the read operation request and using the compressed tree data structure, a database associated with the database management system; and returning a value associated with the read operation request, wherein searching the database using the compressed tree data structure is faster than searching the database based on the first tree data structure.

* * * * *